(12) United States Patent
Yamaki et al.

(10) Patent No.: US 11,020,734 B2
(45) Date of Patent: *Jun. 1, 2021

(54) ION EXCHANGE MEMBRANE FOR ALKALI CHLORIDE ELECTROLYSIS, PRODUCTION METHOD, AND ALKALI CHLORIDE ELECTROLYSIS APPARATUS

(71) Applicant: AGC Inc., Chiyoda-ku (JP)

(72) Inventors: Yasushi Yamaki, Chiyoda-ku (JP); Takayuki Kaneko, Chiyoda-ku (JP); Hiromitsu Kusano, Chiyoda-ku (JP); Takuo Nishio, Chiyoda-ku (JP)

(73) Assignee: AGC Inc., Chiyoda-ku (JP)

( * ) Notice: Subject to any disclaimer, the term of this patent is extended or adjusted under 35 U.S.C. 154(b) by 113 days.

This patent is subject to a terminal disclaimer.

(21) Appl. No.: 15/491,371

(22) Filed: Apr. 19, 2017

(65) Prior Publication Data

US 2017/0218527 A1 Aug. 3, 2017

Related U.S. Application Data

(63) Continuation of application No. PCT/JP2015/081640, filed on Nov. 10, 2015.

(30) Foreign Application Priority Data

Nov. 10, 2014 (JP) ............................. JP2014-227994

(51) Int. Cl.
*C25B 13/08* (2006.01)
*B01J 39/05* (2017.01)
(Continued)

(52) U.S. Cl.
CPC ............... *B01J 39/05* (2017.01); *B01J 39/20* (2013.01); *B01J 47/12* (2013.01);
(Continued)

(58) Field of Classification Search
CPC ......... C25B 13/00; C25B 13/02; C25B 13/04; C25B 13/08; H01M 2/14; H01M 2/145;
(Continued)

(56) References Cited

U.S. PATENT DOCUMENTS 5,384,019 A 1/1995 Keating et al.
2002/0034904 A1* 3/2002 Sakuma ................. D03D 15/00
442/194

(Continued)

FOREIGN PATENT DOCUMENTS

CN 1624202 A 6/2005
JP 7-188434 7/1995
(Continued)

OTHER PUBLICATIONS

Machine Translation of JP2004-43594A (Year: 2019).*
International Search Report dated Dec. 15, 2015 in PCT/JP2015/081640, filed on Nov. 10, 2015.

*Primary Examiner* — Alexander W Keeling
(74) *Attorney, Agent, or Firm* — Oblon, McClelland, Maier & Neustadt, L.L.P.

(57) ABSTRACT

To provide an ion exchange membrane for alkali chloride electrolysis which has high membrane strength and low membrane resistance, thereby capable of reducing the electrolysis voltage during alkali chloride electrolysis. In this ion exchange membrane (1) for alkali chloride electrolysis, a reinforcing material 20 formed by weaving reinforcing yarns 22 and sacrificial yarns 24 is disposed in a layer (S) 14, and layer (S) 14 has elution portions 28 formed by elution of at least portions of the sacrificial yarns 24. In a cross section perpendicular to reinforcing yarns of the warp, the average distance (d1) from the center of a reinforcing yarn 22 to the center of the adjacent reinforcing yarn 22, the total area (P) obtained by adding the cross-sectional area of an elution portion 28 and the cross-sectional area of a sacrificial yarn (Continued)

24 remaining in the elution portion 28, the number (n) of elution portions between adjacent reinforcing yarns 22, and the ion exchange capacity of a layer (Sa) located on the most anode side in the layer (S) 14 during alkali chloride electrolysis, are controlled to be within specific ranges, respectively.

11 Claims, 2 Drawing Sheets

(51) Int. Cl.
  *B01J 39/20*    (2006.01)
  *B01J 47/12*    (2017.01)
  *C08F 214/26*    (2006.01)
  *C08F 216/14*    (2006.01)
  *C25B 9/10*    (2006.01)
  *C08J 5/22*    (2006.01)
  *C25B 9/23*    (2021.01)
  *C25B 1/46*    (2006.01)

(52) U.S. Cl.
  CPC .... *C08F 214/262* (2013.01); *C08F 216/1416* (2013.01); *C08F 216/1466* (2013.01); *C08J 5/2281* (2013.01); *C25B 9/23* (2021.01); *C25B 13/08* (2013.01); *C08F 216/1475* (2020.02); *C08J 5/225* (2013.01); *C08J 2327/18* (2013.01); *C08J 2329/10* (2013.01); *C25B 1/46* (2013.01)

(58) Field of Classification Search
  CPC ......... H01M 2/16–2/1686; H01M 2/18; B01D 69/00; B01D 69/02–69/14
  See application file for complete search history.

(56) References Cited

U.S. PATENT DOCUMENTS

| | | | | |
|---|---|---|---|---|
| 2012/0234674 A1* | 9/2012 | Kameyama | ............. | C25B 13/02 204/252 |
| 2014/0360868 A1 | 12/2014 | Yamaki et al. | | |
| 2017/0137952 A1* | 5/2017 | Kaneko | ................... | B01J 47/12 |

FOREIGN PATENT DOCUMENTS

| | | | | |
|---|---|---|---|---|
| JP | 2002-79114 | | 3/2002 | |
| JP | 2004-43594 | | 2/2004 | |
| JP | 2004-43594 A | * | 2/2004 | ............... C08J 5/22 |
| JP | 2013-163857 | | 8/2013 | |
| WO | WO 2011/052538 A1 | | 5/2011 | |
| WO | WO 2013/129399 A1 | | 9/2013 | |

* cited by examiner

ION EXCHANGE MEMBRANE FOR ALKALI CHLORIDE ELECTROLYSIS, PRODUCTION METHOD, AND ALKALI CHLORIDE ELECTROLYSIS APPARATUS

TECHNICAL FIELD

The present invention relates to an ion exchange membrane for alkali chloride electrolysis, a method for its production, and an alkali chloride electrolysis apparatus.

BACKGROUND ART

As an ion exchange membrane to be used in an alkali chloride electrolysis method for producing an alkali hydroxide and chlorine by electrolyzing an alkali chloride aqueous solution, an electrolyte membrane made of a fluorinated polymer having ion exchange groups (carboxylic acid functional groups, sulfonic acid functional groups, etc.) is known.

In order to maintain the mechanical strength and dimensional stability, the electrolyte membrane is usually reinforced by embedding a reinforcing fabric made of reinforcing yarns (polytetrafluoroethylene (hereinafter referred to as PTFE) yarns, etc.) in a layer (S) comprising a fluorinated polymer having sulfonic acid functional groups. However, with an ion exchange membrane having a reinforcing fabric made of PTFE yarns, etc., the membrane resistance tends to be high, and the electrolysis voltage tends to increase.

Therefore, a method of using a reinforcing fabric obtained by interweaving reinforcing yarns of PTFE, etc. and sacrificial yarns (polyethylene terephthalate (hereinafter referred to as PET) yarns, etc.) soluble in an alkaline aqueous solution, has been proposed (e.g. Patent Document 1). Sacrificial yarns are at least partially dissolved in the following stage (i) and mostly or entirely eluted and removed in stage (ii), and thus, at the time of the main operation of alkali chloride electrolysis using the ion exchange membrane, they do not affect the membrane resistance.

Stage (i): A reinforced precursor membrane obtained by reinforcing a precursor membrane comprising a fluorinated polymer having groups convertible to ion exchange groups, with a reinforcing fabric, is immersed in an alkaline aqueous solution, to hydrolyze the groups convertible to ion exchange groups and convert them to the ion exchange groups.

Step (ii): The ion exchange membrane is disposed in an electrolytic cell, followed by a conditioning operation before the main operation of alkali chloride electrolysis.

PRIOR ART DOCUMENT

Patent Document

Patent Document 1: JP-A-2004-43594

DISCLOSURE OF INVENTION

Technical Problem

In an ion exchange membrane for alkali chloride electrolysis having a reinforcing fabric having reinforcing yarns and sacrificial yarns, in order to further enhance the membrane strength, it is important to further narrow the spacing between reinforcing yarns in the reinforcing fabric. However, if the spacing between reinforcing yarns is narrowed, the membrane resistance will increase, and the electrolysis voltage becomes high. Therefore, it is difficult to reduce the electrolysis voltage, while increasing the membrane strength of the ion exchange membrane.

It is an object of the present invention to provide an ion exchange membrane for alkali chloride electrolysis which has a low membrane resistance and which is capable of reducing the electrolysis voltage at the time of alkali chloride electrolysis even if the spacing between reinforcing yarns is narrowed in order to increase the membrane strength; a method for its production; and an alkali chloride electrolysis apparatus using such an ion exchange membrane.

Solution to Problem

The gist of the present invention is in the following [1] to [15].

[1] An ion exchange membrane for alkali chloride electrolysis to be used as installed in an alkali chloride electrolytic cell provided with a cathode and an anode so as to partition inside of the electrolytic cell into a cathode chamber on the cathode side and an anode chamber on the anode side, characterized in that said ion exchange membrane for alkali chloride electrolysis has a layer (S) comprising a fluorinated polymer having sulfonic acid functional groups, and a reinforcing material disposed in said layer (S) substantially in parallel to the layer (S);

said layer (S) is a laminate of a single layer (Sa) disposed at the most anode side, at least one layer (Sb) disposed on the cathode side than the layer (Sa), and the reinforcing material disposed between the layer (Sa) and the layer (Sb), or in the layer (Sb);

the reinforcing material is a woven fabric using reinforcing yarns for the weft and warp and optionally using sacrificial yarns for the weft and warp, in a cross section of the layer (S) perpendicular to the length direction of the reinforcing yarns, the average distance (d1) from the center of a reinforcing yarn to the center of the adjacent reinforcing yarn is from 750 to 1,000 μm; in the layer (S), elution portions formed by elution of the sacrificial yarns are present; the total area (P) of the cross-sectional area of an elution portion and the cross-sectional area of a sacrificial yarn remaining in the elution portion is from 500 to 5,000 μm²; and the average number of elution portions between adjacent reinforcing yarns is from 4 to 6;

and the ion exchange capacity of said layer (Sa) is at least 1.15 meq/g dry resin.

[2] The ion exchange membrane for alkali chloride electrolysis according to [1], wherein the ion exchange capacity of the layer (Sb) is lower than the ion exchange capacity of the layer (Sa).

[3] The ion exchange membrane for alkali chloride electrolysis according to [1] or [2], which has at least one layer (C) comprising a fluorinated polymer having carboxylic acid functional groups, on the most cathode side surface of the layer (S).

[4] The ion exchange membrane for alkali chloride electrolysis according to any one of [1] to [3], wherein a relationship is established to satisfy the following formula (1) in a cross section perpendicular to the length direction of the reinforcing yarns:

$$0.5 \le \{d2/d1 \times (n+1)\} \le 1.5 \qquad (1)$$

provided that symbols in the formula (1) have the following meanings, d1: the average distance from the center of a reinforcing yarn to the center of the adjacent reinforcing yarn, d2: the average distance from the center of an elution portion to the center of the adjacent elution portion, n: the average number of elution portions that exist between adjacent reinforcing yarns.

[5] The ion exchange membrane for alkali chloride electrolysis according to [4], wherein a relationship is established to satisfy the following formula (1') at all measurement points measured to determine the average distance (d1) and the average distance (d2) in a cross section perpendicular to the length direction of the reinforcing yarns:

$$0.5 \leq \{d2'/d1 \times (n+1)\} \leq 1.5 \quad (1')$$

provided that the symbols in the formula (1') have the following meanings, d2': the distance from the center of an elution portion to the center of the adjacent elution portion at an optional measurement point, d1 and n: the same as above.

[6] The ion exchange membrane for alkali chloride electrolysis according to any one of [1] to [5], wherein a relationship is established to satisfy the following formula (2) in a cross section perpendicular to the length direction of the reinforcing yarns:

$$0.5 \leq \{d3/d1 \times (n+1)\} \leq 1.5 \quad (2)$$

provided that the symbols in the formula (2) have the following meanings, d3: the average distance from the center of a reinforcing yarn to the center of the adjacent elution portion, d1 and n: the same as above.

[7] The ion exchange membrane for alkali chloride electrolysis according to [6], wherein a relationship is established to satisfy the following formula (2') at all measurement points measured to determine the average distance (d1) and the average distance (d3) in a cross section perpendicular to the length direction of the reinforcing yarns:

$$0.5 \leq \{d3'/d1 \times (n+1)\} \leq 1.5 \quad (2')$$

provided that the symbols in the formula (2') have the following meanings, d3': the distance from the center of a reinforcing yarn to the center of the adjacent elution portion at an optional measurement point, d1 and n: the same as above.

[8] The ion exchange membrane for alkali chloride electrolysis according to any one of [1] to [7], wherein the thicknesses of the reinforcing yarns in a cross section perpendicular to the length direction of the reinforcing yarns are from 70 to 160 μm.

[9] An alkali chloride electrolysis apparatus having an electrolytic cell provided with a cathode and an anode, and an ion exchange membrane for alkali chloride electrolysis as defined in any one of [1] to [8], wherein the ion exchange membrane for alkali chloride electrolysis is installed between the anode and the cathode in said electrolytic cell substantially in parallel to them, so as to partition inside of the cell into a cathode chamber on the cathode side and an anode chamber on the anode side.

[10] A method for producing an ion exchange membrane as defined in [1], which comprises obtaining a reinforced precursor membrane having a reinforcing fabric composed of reinforcing yarns and sacrificial yarns, disposed in a precursor membrane comprising a fluorinated polymer having groups convertible to ion exchange groups, and then contacting the reinforced precursor membrane with an alkaline aqueous solution to convert the groups convertible to ion exchange groups, to the ion exchange groups, and at the same time to elute at least a portion of the sacrificial yarns in the reinforcing fabric, thereby to obtain an ion exchange membrane comprising a fluorinated polymer having the ion exchange groups, a reinforcing material having at least a portion of the sacrificial yarns in the reinforcing fabric eluted, and elution portions.

[11] The method for producing an ion exchange membrane for alkali chloride electrolysis according to [10], wherein the ion exchange capacity of the layer (Sb) located on the cathode side than the layer (Sa) during alkali chloride electrolysis, is lower than the ion exchange capacity of the layer (Sa).

[12] The method for producing an ion exchange membrane for alkali chloride electrolysis according to [10] or [11], which further has a layer (C) comprising a fluorinated polymer having carboxylic acid functional groups on the opposite side surface to the layer (Sa).

[13] The method for producing an ion exchange membrane for alkali chloride electrolysis according to any one of [10] to [12], wherein a relationship is established to satisfy the following formula (1) in a cross section perpendicular to the reinforcing yarns of the warp:

$$0.5 \leq \{d2/d1 \times (n+1)\} \leq 1.5 \quad (1)$$

provided that symbols in the formula (1) have the following meanings, d1: the average distance from the center of a reinforcing yarn to the center of the adjacent reinforcing yarn, d2: the average distance from the center of an elution portion to the center of the adjacent elution portion, n: number of elution portions between adjacent reinforcing yarns.

[14] The method for producing an ion exchange membrane for alkali chloride electrolysis according to any one of [10] to [13], wherein a relationship is established to satisfy the following formula (2) in a cross section perpendicular to the reinforcing yarns of the warp:

$$0.5 \leq \{d3/d1 \times (n+1)\} \leq 1.5 \quad (2)$$

provided that the symbols in the formula (2) have the following meanings.

d3: the average distance from the center of a reinforcing yarn to the center of the adjacent elution portion, d1 and n: the same as above.

[15] The method for producing an ion exchange membrane for alkali chloride electrolysis according to any one of [10] to [14], wherein the widths of the reinforcing yarns as seen from the direction perpendicular to the fabric surface of the reinforcing fabric are from 70 to 160 μm.

Advantageous Effects of Invention

The ion exchange membrane for alkali chloride electrolysis of the present invention has a low membrane resistance and is capable of reducing the electrolysis voltage at the time of alkali chloride electrolysis even if the spacing between reinforcing yarns is made narrow to increase the membrane strength.

The alkali chloride electrolysis apparatus of the present invention has an ion exchange membrane for alkali chloride electrolysis having a high membrane strength, and whereby the membrane resistance is low and the electrolysis voltage at the time of alkali chloride electrolysis is low.

DESCRIPTION OF EMBODIMENTS

Figure 1:
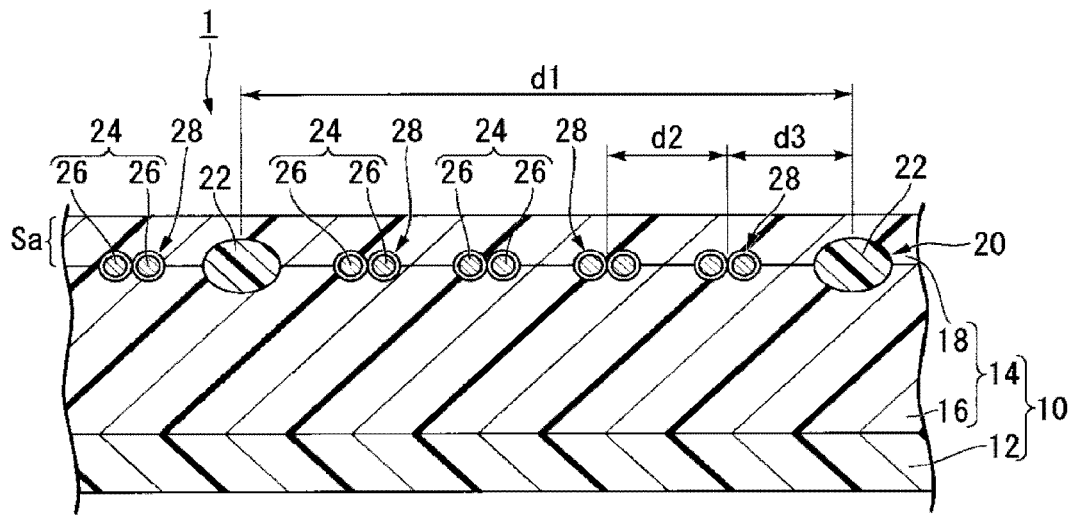
FIG. 1 is a schematic cross-sectional view showing one example of the ion exchange membrane for alkali chloride electrolysis of the present invention.
Figure 2:
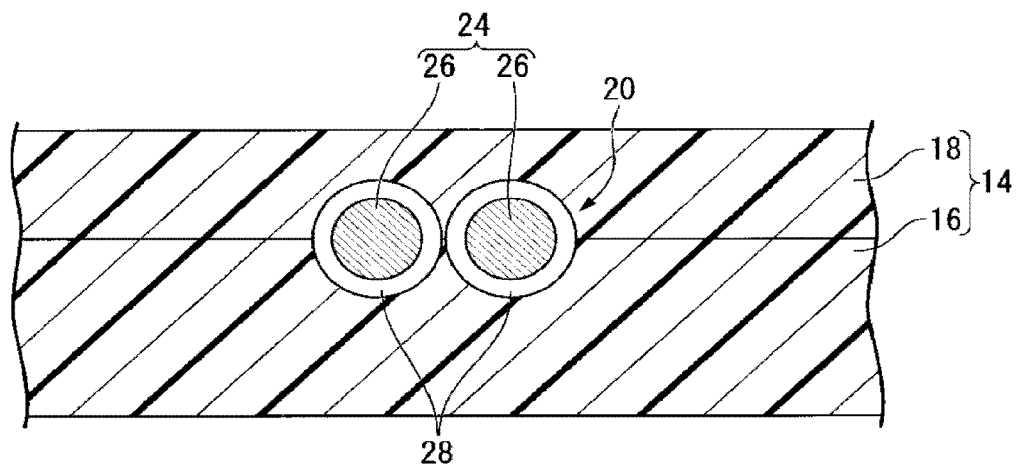
FIG. 2 is a schematic enlarged cross-sectional view of the vicinity of the surface of the layer (S) of the ion exchange membrane for alkali chloride electrolysis in FIG. 1.

The following definitions of terms apply throughout this specification including claims.

An "ion exchange group" is a group in which at least some of ions contained in the group may be exchanged to other ions. The following carboxylic acid functional group or sulfonic acid functional group may, for example, be mentioned.

A "carboxylic acid functional group" means a carboxylic acid group (—COOH) or a carboxylate group (—COOM$^1$, wherein M$^1$ is an alkali metal or a quaternary ammonium base).

A "sulfonic acid functional group" means a sulfonic acid group (—SO$_3$H) or a sulfonate group (—SO$_3$M$^2$, wherein M$^2$ is an alkali metal or a quaternary ammonium base).

A "group convertible to an ion exchange group" means a group which can be converted to an ion exchange group by a known treatment such as hydrolysis treatment or acid-form processing.

A "group convertible to a carboxylic acid functional group" means a group which can be converted to a carboxylic acid functional group by a known treatment such as hydrolysis treatment or acid-form processing.

A "group convertible to a sulfonic acid functional group" means a group which can be converted to a sulfonic acid functional group by a known treatment such as hydrolysis treatment or acid-form processing.

A "perfluorocarbon polymer" means a polymer wherein all of hydrogen atoms bonded to carbon atoms in the polymer are substituted by fluorine atoms. Some of the fluorine atoms in the perfluorocarbon polymer may be substituted by chlorine atoms or bromine atoms.

A "monomer" means a compound having a polymerization reactive carbon-carbon double bond.

A "unit (structural unit)" means a moiety derived from a monomer, which is present in a polymer to constitute the polymer. In a case where a unit is formed by an addition polymerization of a monomer having a carbon-carbon unsaturated double bond, the unit derived from such a monomer is a divalent unit formed by cleavage of the unsaturated double bond. Further, one having a structure of a certain unit chemically converted after polymer formation may also be referred to as a unit. In the following, as the case requires, units derived from an individual monomer may be represented by a name having the monomer's name followed by "units".

A "reinforcing fabric" means a cloth-form woven fabric to be used as a raw material for a "reinforcing material" to improve the strength of an ion exchange membrane. The "reinforcing fabric" is a woven fabric formed by weaving reinforcing yarns and sacrificial yarns as the warp, and reinforcing yarns and sacrificial yarns as the weft. The warp and weft yarns are orthogonal to each other in the case of a normal weaving method such as plain weaving.

The "reinforcing yarns" are yarns to constitute the warp and weft of the reinforcing fabric. The "reinforcing yarns" are made of a material which will not be dissolved even when immersed in an aqueous sodium hydroxide solution (e.g. an aqueous solution having a concentration of 32 mass %) and made of a material which will not form an elution portion. Thus, even after immersion in an aqueous alkaline solution in the production of an ion exchange membrane, the reinforcing yarns will remain undissolved and will maintain the mechanical strength and dimensional stability of the ion exchange membrane for alkali chloride electrolysis.

The "sacrificial yarns" are yarns to constitute the warp and weft of the reinforcing fabric, and when immersed in an aqueous sodium hydroxide solution (an aqueous solution having a concentration of 32 mass %), they will be dissolved in the aqueous sodium hydroxide solution, and thus, they are made of a material to be eluted to form elution portions. When immersed in an alkaline aqueous solution in the production of an ion exchange membrane, a part or whole of sacrificial yarns in the reinforcing fabric present in the layer (S) will be eluted to form elution portions. If a part of a sacrificial yarn is eluted, the rest of the sacrificial yarn not eluted will be present in the elution portion.

Each of a reinforcing yarn and a sacrificial yarn may be a monofilament consisting of one filament or may be a multifilament composed of two or more filaments. In the case of a multifilament, an assembly of two or more filaments will be one yarn. The thickness of the yarn is meant for the maximum diameter in the case of a monofilament, and, in the case of a multifilament, it is meant for the maximum diameter when the bundle of a plurality of filaments is regarded as one yarn.

An "elution portion" means a hole to be formed inside of an ion exchange membrane, as a result of elution of one sacrificial yarn, when the yarn is immersed in an aqueous sodium hydroxide solution (e.g. an aqueous solution having a concentration of 32 mass %). In a case where the one sacrificial yarn is a monofilament, at least a part of the material of the monofilament will be eluted to form one hole inside of the ion exchange membrane. In a case where the one sacrificial yarn is a multifilament, a collection of a plurality of holes will be formed inside of the ion exchange membrane as a result of at least partial elution of the multifilament, and this collection of a plurality of holes is regarded as one elution portion. The collection of holes is not necessarily required to form a single hole, but may, for example, form a single hole shape as they are connected to one another.

A "reinforcing material" is a material having a part or whole of sacrificial yarns eluted in a reinforcing fabric, when the reinforcing fabric disposed in a reinforced precursor membrane made of a fluorinated polymer is immersed in an alkaline aqueous solution. In the case where a part of sacrificial yarns is eluted, the reinforcing material is composed of the remaining sacrificial yarns and the reinforcing yarns. In a case where whole of sacrificial yarns is dissolved, the reinforcing material is composed solely of reinforcing yarns. That is, the reinforcing material is a material formed from reinforcing yarns and sacrificial yarns optionally contained.

The reinforcing yarns constituting the reinforcing material are used as the warp and weft. The warp and weft are usually orthogonal, and are, respectively, present in parallel to the MD direction and the TD direction of the ion exchange membrane. Here, MD (Machine Direction) is a direction in which, in the production of an ion exchange membrane using a roll device, a precursor membrane, a reinforced precursor membrane and an ion exchange membrane are conveyed. TD (Transverse Direction) is a direction perpendicular to the MD direction.

The "center of a reinforcing yarn" is meant for a point at ½ of the maximum diameter of a reinforcing yarn in a cross section perpendicular to the direction in which the thread of the reinforcing yarn extends (i.e. to the longitudinal direction). Reinforcing yarns are used for the warp and weft, and thus, there are two directions as their length directions.

In a case where the cross-section of a reinforcing yarn is a perfect circle, the center of the reinforcing yarn is the center point of the circle, but, in a case other than a perfect circle, it is a point at ½ of the maximum diameter. Further, in a case where the reinforcing yarn is a multifilament, the center is a point at ½ of the line connecting the farthest centers.

The "center of an elution portion" is meant for the center in the width direction of the elution portion in a cross section perpendicular to the direction in which the sacrificial yarn in the ion exchange membrane extends (i.e. to the longitudinal direction). Since the sacrificial yarns are also used as the warp and weft, there are two directions as their length directions. In a case where a sacrifice yarn is a monofilament, the center of the sacrificial yarn before elution coincides with the center of the elution hole. The center of the elution hole in a case where the sacrificial yarn is a multifilament, is an intermediate point between the one end of the hole and the other end of the hole in the width direction in said cross-section.

An "aperture ratio" means a percentage (%) of the area of the portion excluding reinforcing yarns to the area in the surface direction of the reinforcing material.

A "reinforced precursor membrane" means a membrane having a reinforcing fabric made of reinforcing yarns and sacrificial yarns disposed in a precursor membrane comprising a fluoropolymer having groups convertible to ion exchange groups. It is preferred to prepare two sheets of precursor membrane comprising a fluoropolymer having groups convertible to ion exchange groups and laminate a reinforcing fabric between the two sheets of precursor membrane.

A "precursor membrane" means a membrane comprising a fluoropolymer having groups convertible to ion exchange groups. It may be a membrane composed of a single layer of a fluoropolymer having groups convertible to ion exchange groups or may be a membrane composed of a plurality of such layers.

In the present invention, in the production process, a layer formed by joining layers or films, or a layer and a film, having the same type of functional groups and the same ion exchange capacity, is regarded as one layer.

<Ion Exchange Membrane for Alkali Chloride Electrolysis>

The ion exchange membrane for alkali chloride electrolysis of the present invention (hereinafter simply referred to also as the ion exchange membrane) is to be used for alkali chloride electrolysis as disposed or mounted substantially vertically between an anode and a cathode at the time of alkali chloride electrolysis. The ion exchange membrane is an ion exchange membrane having a layer (S) comprising a fluorinated polymer having sulfonic acid functional groups, and the layer (S) comprises a single layer (Sa) and at least one layer (Sb). The layer (Sa) is disposed on the most anode side of the layer (S), and the layer (Sb) is disposed on the cathode side than the layer (Sa).

Further, a reinforcing material is disposed between the layer (Sa) and the layer (Sb), and they are laminated to have a laminate structure.

The reinforcing material is composed of reinforcing yarns and sacrificial yarns optionally contained. The reinforcing material is obtained from a reinforcing fabric, but at least part of the material of sacrificial yarns of the reinforcing fabric is eluted in the process for producing the ion exchange true membrane, to form elution portions in the layer (S). The reinforcing material has a function to improve the mechanical strength and dimensional stability of the ion exchange membrane.

The layer (Sb) forming the layer (S) may be formed from a single layer or may be formed from two or more layers. In the case where the layer (Sb) is made of two or more layers, in the present specification, such a case may be referred to also as "layer (Sb)" which represents all of layers (Sb).

The ion exchange membrane for alkali chloride electrolysis of the present invention preferably further has at least one layer (C) comprising a fluorinated polymer having carboxylic acid functional groups on the most cathode side surface of the layer (S).

FIG. 1 is a schematic cross-sectional view showing an example of the ion exchange membrane of the present invention.

The ion exchange membrane 1 is one having an electrolyte membrane 10 comprising a fluorinated polymer having ion exchange groups reinforced by a reinforcing material 20.

The electrolyte membrane 10 is a laminate comprising a layer (C) 12 which comprises a fluorinated polymer having carboxylic acid functional groups, and a layer (S) 14 which comprises a fluorinated polymer having sulfonic acid functional groups. The layer (S) 14 has a two-layer structure of a layer (Sb) 16 which is located on the cathode side at the time of alkali chloride electrolysis, and a layer (Sa) 18 which is located on the anode side at the time of alkali chloride electrolysis. That is, the electrolyte membrane 10 is a laminate having the layer (C) 12, the layer (Sb) 16 and the layer (Sa) 18 laminated in this order. Further, a reinforcing material 20 is disposed between the layer (Sb) 16 and the layer (Sa) 18 in the layer (S) 14.

The reinforcing material 20 is a material for reinforcing the electrolyte membrane 10, and it is made of a woven fabric obtained by weaving reinforcing yarns 22 and sacrificial yarns 24 optionally contained, but in a case where whole of sacrificial yarns has been eluted in the production process of the ion exchange membrane, the reinforcing material consists only of reinforcing yarns.

The layer (S) 14 has an elution portion 28 consisting of a collection of at least two holes formed by elution of at least part of the material of two filaments 26 constituting a sacrificial yarn 24.

The ion exchange membrane 1 is disposed in an electrolytic cell so that the layer (Sa) 18 faces the anode at the time of alkali chloride electrolysis.

<Construction of Ion Exchange Membrane for Alkali Chloride Electrolysis>

The ion exchange membrane of the present invention is one having an electrolyte membrane comprising a fluorinated polymer having sulfonic acid functional groups reinforced by a reinforcing material.

The electrolyte membrane is a membrane which is at least provided with a layer (S) comprising a fluorinated polymer having sulfonic acid functional groups, and which is, as the case requires, further provided with a layer (C) comprising a fluorinated polymer having carboxylic acid functional groups, as a functional layer that exhibits high current efficiency. The electrolyte membrane may be a membrane composed only of the layer (S), or may be a laminate membrane having the layer (S) and the layer (C) laminated. The layer (S) has a laminated structure consisting of a layer (Sa) and a layer (Sb).

In a case where the ion exchange membrane is reinforced with a reinforcing material, reinforcing yarns will prevent migration of cations such as sodium ions in the membrane, whereby it is considered that the vicinity on the cathode side of the reinforcing yarns in the ion exchange membrane will be a region that does not substantially act as an electrolyte portion (hereinafter referred to as a current shielded region). Therefore, it is considered that if the density of reinforcing yarns is increased by narrowing the spacing between the reinforcing yarns, the current shielded region within the ion exchange membrane will be more, whereby the membrane resistance will be increased and the electrolysis voltage becomes high.

Whereas, in the ion exchange membrane of the present invention, it is possible to reduce the membrane resistance while increasing the membrane strength, by controlling so that in a cross section perpendicular to the length direction of reinforcing yarns, the average distance (d1) from the center of a reinforcing yarn to the center of the adjacent reinforcing yarn is from 750 to 1,000 μm, the total area (P) being the sum of the cross-sectional area of an elution hole and the cross-sectional area of a sacrificial yarn remaining in the elution hole is from 500 to 5,000 μm$^2$, and the average number (n) of elution portions between adjacent reinforcing yarns is from 4 to 6.

When the above total area (P) is small, it tends to be difficult for sodium ions, etc. to pass through elution portions in the vicinity of reinforcing yarns, and the membrane resistance in the vicinity of the reinforcing yarns tends to be high as compared to when the total area (P) is large. On the other hand, at a location apart from reinforcing yarns, the volume of elution portions is small as compared to when the total area (P) is large, whereby an extra resistance does not increase, and the membrane resistance becomes low. Further, when the above total area (P) is large, in the vicinity of reinforcing yarns, it tends to be easy for sodium ions, etc. together with electro-osmotic water to pass through elution portions, and the current shielding region becomes small, whereby the membrane resistance in the vicinity of reinforcing yarns tends to be low as compared to when the total area (P) is small. On the other hand, at a location apart from the reinforcing yarns, the volume of elution portions is large as compared to when the total area (P) is small, whereby an extra resistance increases, and the membrane resistance tends to be high.

Further, when the above average number (n) of elution portions is small, as in the case where the total area (P) is small, it tends to be difficult for sodium ions, etc. to pass therethrough in the vicinity of reinforcing yarns, and the membrane resistance in the vicinity of reinforcing yarns becomes high as compared to when the average number (n) of elution portions is large. On the other hand, at a location apart from the reinforcing yarns, the volume of elution portions tends to be small, whereby an extra resistance will not increase and the film resistance tends to be low as compared to when the average number (n) of elution portions is large. Further, when the above average number (n) of elution portions is large, it becomes easy for sodium ions, etc. to pass therethrough in the vicinity of reinforcing yarns, and the current shielding region becomes smaller, whereby the membrane resistance in the vicinity of reinforcing yarns tends to be low as compared to when the average number (n) of elution portions is small. On the other hand, at a location apart from reinforcing yarns, the volume of elution portions is larger, and an extra resistance will increase, whereby the membrane resistance tends to be higher than when the average number (n) of elution portions is small.

In the present invention, by controlling the above total area (P) and average number (n) of elution portions to be within the specific ranges, the current shielding region in the vicinity of reinforcing yarns is made small to lower the membrane resistance in the vicinity of reinforcing yarns, while the volume of elution portions at a location apart from reinforcing yarns is maintained to be small to some extent, whereby an increase in the membrane resistance at that location is suppressed. Thus, as compared with the degree of increase in the membrane resistance at a location apart from reinforcing yarns, the degree of decrease in the membrane resistance in the vicinity of reinforcing yarns is large, whereby the membrane resistance as the whole membrane is reduced, and thus, it is considered possible to lower the electrolysis voltage at the time of alkali chloride electrolysis even if the membrane strength is increased by narrowing the spacing between the reinforcing yarns.

Further, in the present invention, the ion exchange capacity of the layer (Sa) located on the side closest to the anode during alkali chloride electrolysis, in the layer (S), is at least 1.15 meq/g dry resin, whereby the water content of the layer (Sa) in the layer (S) becomes high. As the water content of the layer (Sa) becomes high, the water content of the layer (Sb) in the layer (S) will also become sufficiently high, and consequently, the membrane resistance as the entire membrane of the ion exchange membrane becomes to be sufficiently small. Thus, the electrolysis voltage during alkali chloride electrolysis becomes to be low.

In the present invention, the average distance (d1), the total area (P) and the average number (n) of elution portions are controlled to be within the specific ranges, and at the same time, the ion exchange capacity of the layer (Sa) in the layer (S) is adjusted to be at least 1.15 meq/g dry resin. As the effect for reducing the electrolysis voltage by the use of such an ion-exchange membrane, a synergistic effect is obtainable which is larger than the combined effect for reducing the electrolysis voltage obtainable by independently conducting the control of the average distance (d1), the total area (P) and the average number (n) of elution portions, and the control of the ion exchange capacity of the layer (Sa) in the layer (S), and the electrolysis voltage during alkali chloride electrolysis becomes to be unexpectedly low.

[Electrolyte Membrane]

Now, the respective layers constituting the electrolyte membrane will be described.

(Layer (S))

The fluorinated polymer having sulfonic acid functional groups may be a copolymer comprising units derived from a fluorinated monomer having a sulfonic acid functional group, and units derived from the fluorinated olefin.

The fluorinated polymer having sulfonic acid functional groups is obtainable in step (b) as described later, by converting groups convertible to sulfonic acid functional groups in a fluorinated polymer having the groups convertible to sulfonic acid functional group as described later, to such sulfonic acid functional groups.

<Ion Exchange Capacity of Layer (S)>

The ion exchange capacity of the layer (Sa) located on the most anode side in the layer (S) at the time of alkali chloride electrolysis, is at least 1.15 meq/g dry resin. As the ion exchange capacity of the layer (Sa) is at least 1.15 meq/g dry resin, the water content of the layer (Sa) in the layer (S) becomes high. Further, consequently, the water content of the layer (Sb) located on the cathode side than the layer (Sa) in the layer (S) will be sufficiently high. Thus, as a result, the membrane resistance as the entire membrane of the ion exchange membrane becomes to be sufficiently small, and the electrolytic voltage at the time of alkali chloride electrolysis becomes low.

The lower limit value of the ion exchange capacity of the layer (Sa) in the layer (S) is preferably 1.2 meq/g dry resin, more preferably 1.3 meq/g dry resin. The upper limit value of the ion exchange capacity of the layer (Sa) is, from the viewpoint of molding stability and membrane strength, preferably 2.0 meq/g dry resin, more preferably 1.8 meq/g dry resin.

In the present invention, the ion exchange capacity of the layer (Sa) and the ion exchange capacity of the layer (Sb) may be the same or different.

The ion exchange capacity of the layer (Sb) is preferably lower than the ion exchange capacity of the layer (Sa), from such a viewpoint that the membrane strength will be high.

The ion exchange capacity of the layer (Sb) is preferably from 0.6 to 1.19 meq/g dry resin, more preferably from 0.7 to 1.19 meq/g dry resin. When the ion exchange capacity of the layer (Sb) is at least the above lower limit value, the membrane resistance of the ion exchange membrane can easily be made low, and the electrolysis voltage at the time of alkali chloride electrolysis can easily be made low. When the ion exchange capacity of the layer (Sb) is at most the above upper limit value, it is possible to maintain the strength and degradation resistance by salt precipitation, which are required as the membrane during electrolysis.

<Thickness of Layer (S)>

The thickness of the layer (Sb) is preferably from 30 to 140 μm, more preferably from 30 to 100 μm. When the thickness of the layer (Sb) is at least the above lower limit value, the mechanical strength of the ion exchange membrane will be sufficiently high. When the thickness of the layer (Sb) is at most the above upper limit value, the membrane resistance of the ion exchange membrane can be suppressed to be sufficiently low, and increase of the electrolysis voltage can be sufficiently suppressed.

The thickness of the layer (Sa) is preferably from 10 to 60 μm, more preferably from 10 to 40 μm. When the thickness of the layer (Sa) is at least the above lower limit value, a reinforcing fabric fits in the electrolyte membrane, and the peeling resistance of the reinforcing fabric will be improved. Further, the reinforcing fabric will not be too close to the surface of the electrolyte membrane, whereby cracking is less likely to occur at the surface of the electrolyte membrane, and as a result, lowering of the mechanical strength can be suppressed. When the thickness of the layer (Sa) is at most the above upper limit value, the membrane resistance of the ion exchange membrane can be suppressed to be sufficiently low, whereby increase of the electrolysis voltage can be sufficiently suppressed.

(Layer (C))

The fluorinated polymer having carboxylic acid functional groups may, for example, be a copolymer comprising units derived from a fluorinated monomer having a carboxylic acid functional group, and units derived from a fluorinated olefin.

The fluorinated polymer having carboxylic acid functional groups, is obtainable in step (b) as described later, by converting groups convertible to carboxylic acid functional groups in the fluorinated polymer having the groups convertible to carboxylic acid functional groups, as described later, to such carboxylic acid functional groups.

The thickness of the layer (C) is preferably from 5 to 50 μm, more preferably from 10 to 35 μm. When the thickness of the layer (C) is at least the above lower limit value, a high current efficiency tends to be easily obtainable. Further, in the case where electrolysis of sodium chloride is conducted, it is possible to reduce the amount of sodium chloride in the sodium hydroxide as the product. When the thickness of the layer (C) is at most the above upper limit value, the membrane resistance of the ion exchange membrane can be suppressed to be low, and the electrolysis voltage can easily be controlled to be low.

[Position of Reinforcing Material]

The reinforcing material is disposed in the layer (S) comprising a fluorinated polymer having sulfonic acid functional groups. Being "disposed in the layer (S)" means that it is disposed in one layer, as laminated between layers or films, or a layer and a film, which have the same type of functional groups and the same ion exchange capacity, or it is laminated between two layers (S) different in the ion exchange capacity, etc.

The reinforcing material is preferably laminated between the layer (Sa) and the layer (Sb) or disposed in the layer (Sb), and more preferably laminated between the layer (Sa) and the layer (Sb).

[Reinforcing Material]

The reinforcing material is a reinforcing material to reinforce the electrolyte membrane, and is a woven fabric obtained by weaving reinforcing yarns and sacrificial yarns.

In the ion exchange membrane of the present invention, in order to secure the effect of the present invention, it is important that, as measured in a cross section perpendicular to the length direction of reinforcing yarns constituting the reinforcing material, the average distance between reinforcing yarns, the average number of elution holes, and the total area (P) of the cross-sectional area of an elution hole and the cross-sectional area of a sacrificial yarn remaining in the elution hole as not eluted, are, respectively, within the specific ranges.

In a cross section perpendicular to the length direction of the reinforcing yarns, the average distance (d1) from the center of a reinforcing yarn to the center of the adjacent reinforcing yarn is from 750 to 1,000 μm, preferably from 800 to 1,000 μm, more preferably from 800 to 930 μm, particularly preferably from 800 to 900 μm. When the average distance (d1) is within the above range, it is possible to reduce the electrolysis voltage at the time of alkali chloride electrolysis, while increasing the membrane strength. When the average distance (d1) is at least the above lower limit value, it is easy to reduce the electrolysis voltage at the time of alkali chloride electrolysis. When the average distance (d1) is at most the above upper limit value, it will be easy to increase the strength of the ion exchange membrane.

The reinforcing material is laminated between the layer (Sa) and the layer (Sb) so that the warp and weft yarns are directed to be in the same direction to the MD direction and the TD direction, respectively, in the production of the ion exchange membrane.

The cross section perpendicular to the length direction of the reinforcing yarns may be a MD cross section perpendicular to the length direction of the warp (cross section cut perpendicular to the MD direction) or a TD cross section perpendicular to the length direction of the weft (cross section cut perpendicular to the TD direction), and is meant for each cross section. Further, the average distance (d1) is an average value of the measured values of the distance from the center of one reinforcing yarn to the center of the adjacent reinforcing yarn. For the measurement of the average distance, the distances at ten locations randomly selected in each cross section are measured, and the average distance is a value obtained by averaging the measured values. Other average values are measured in the same manner.

In the present invention, it is preferred that in a cross section perpendicular to the length direction of reinforcing yarns used for the warp and weft, the distance from the center of a reinforcing yarn to the center of the adjacent reinforcing yarn, is within the above range at all the measurement sites. Thereby it becomes possible to easily obtain the effect to reduce the electrolysis voltage at the time of alkali chloride electrolysis, while increasing the membrane strength. Here, all the measurement sites are meant for all points measured at random in order to calculate the average value. The same applies to values other than d1.

The density (implanted number) of reinforcing yarns in the reinforcing fabric is preferably from 22 to 33 yarns/inch, and more preferably from 25 to 30 yarns/inch. When the density of reinforcing yarns is at least the above lower limit value, the mechanical strength as a reinforcing material will be sufficiently high. When the density of reinforcing yarns is at most the above upper limit value, the membrane resistance of the ion exchange membrane will be suppressed to be sufficiently low, and increase of the electrolysis voltage can be sufficiently suppressed.

The density of sacrificial yarns is preferably an even multiple of the density of reinforcing yarns. Specifically, the density of sacrificial yarns is preferably four times or six times the density of reinforcing yarns. In the case of an odd multiple, the warp and weft of reinforcing yarns do not alternately intersect vertically, whereby after sacrificial yarns have been eluted, a woven fabric texture will not be formed.

The total density of reinforcing yarns and sacrificial yarns is preferably from 110 to 198 yarns/inch from the viewpoint of ease of weaving and less possibility of misalignment.

The aperture ratio of the reinforcing material is preferably from 60 to 90%, more preferably from 70 to 85%. When the aperture ratio of the reinforcing material is at least the above lower limit value, the membrane resistance of the ion exchange membrane can be suppressed to be sufficiently low, and increase of the electrolysis voltage can be sufficiently suppressed. When the aperture ratio of the reinforcing material is at most the above upper limit value, the mechanical strength as a reinforcing material will be sufficiently high. The aperture ratio of the reinforcing material can be obtained from a photomicrograph.

The thickness of the reinforcing material is preferably from 60 to 150 µm, more preferably from 80 to 130 µm. When the thickness of the reinforcing material is at least the above lower limit value, the mechanical strength as a reinforcing material will be sufficiently high. When the thickness of the reinforcing member is at most the above upper limit value, the thickness of the yarn intersections can be suppressed, and it is possible to sufficiently suppress the influence for the electrolysis voltage rise due to current shielding by the reinforcing material.

(Reinforcing Yarns)

As the reinforcing yarns, preferred are ones having durability against the high temperature, chlorine, sodium hypochlorite and sodium hydroxide in alkali chloride electrolysis.

As the reinforcing yarns, from the viewpoint of the mechanical strength, heat resistance, chemical resistance, etc., yarns comprising a fluorinated polymer are preferred, yarns comprising a perfluorocarbon polymer are more preferred, yarns comprising PTFE are further preferred, and PTFE yarns composed solely of PTFE are particularly preferred.

The reinforcing yarns may be monofilaments, or may be multifilaments. In the case where the reinforcing yarns are PTFE yarns, monofilaments are preferred since spinning is thereby easy, and tape yarns obtainable by slitting a PTFE film are more preferred.

The fineness of reinforcing yarns is preferably from 50 to 200 denier, more preferably from 80 to 150 denier. When the fineness of the reinforcing yarns is at least the above lower limit value, the mechanical strength will be sufficiently high. When the fineness of the reinforcing yarns is at most the above upper limit value, the membrane resistance of the ion exchange membrane can be suppressed to be sufficiently low, and increase of the electrolysis voltage can be sufficiently suppressed. Further, the reinforcing yarns will not be too close to the surface of the electrolyte membrane, and cracking is less likely to occur at the surface of the electrolyte membrane, whereby it is possible to prevent lowering of the mechanical strength.

The width of a reinforcing yarn as viewed from the direction perpendicular to the fabric surface of the reinforcing material is from 70 to 160 µm, preferably from 90 to 150 µm, more preferably from 100 to 130 µm. When the width of the reinforcing yarn is at least the lower limit value, the membrane strength of the ion exchange membrane tends to be high. When the width of the reinforcing yarn is at most the above upper limit value, the membrane resistance of the ion exchange membrane can easily be made low, and increase in the electrolysis voltage can easily be prevented.

(Sacrificial Yarns)

Of sacrificial yarns, a part or whole of the material is eluted in the following step (i) in an alkaline aqueous solution, and elution portions will be formed in the layer (S) after the elution. The ion exchange membrane obtained via step (i) will be then installed in an electrolytic cell, and prior to the main operation of alkali chloride electrolysis, a conditioning operation of the following step (ii) will be carried out. Even in a case where sacrificial yarns remaining undissolved in step (i) are present, in step (ii), the remaining material of sacrificial yarns will be mostly or preferably entirely eluted and removed in an alkaline aqueous solution.

Step (i): A reinforced precursor membrane obtained by reinforcing a precursor membrane comprising a fluorinated polymer having groups convertible to ion exchange groups by a reinforcing fabric, is immersed in an alkaline aqueous solution to hydrolyze the groups convertible to ion exchange groups and convert them to the ion exchange groups thereby to produce an ion exchange membrane.

Step (ii): The ion exchange membrane is disposed in an electrolytic cell, and a conditioning operation is carried out before the main operation of alkali chloride electrolysis.

As the sacrificial yarns, preferred are yarns comprising at least one member selected from the group consisting of PET, polybutylene terephthalate (hereinafter referred to as PBT), polytrimethylene terephthalate (hereinafter referred to as PTT), rayon and cellulose. More preferred are PET yarns composed solely of PET, PET/PBT yarns composed of a mixture of PET and PBT, PBT yarns composed solely of PBT, or PTT yarns composed solely of PTT.

As the sacrificial yarns, from the viewpoint of cost, PET yarns are preferred. As the sacrificial yarns, from such a viewpoint that they are hardly eluted in an alkaline aqueous solution in step (i) and it is thereby possible to obtain an ion exchange membrane having a sufficiently high mechanical strength, PBT yarns or PTT yarns are preferred, and PTT yarns are particularly preferred. As the sacrificial yarns, from the viewpoint of the balance between the cost and the mechanical strength of the ion exchange membrane, blended yarns of PET/PBT are preferred.

A sacrificial yarn may be a multifilament having a plurality of filaments gathered, or may be a monofilament. A multifilament is preferred from such a viewpoint that the contact area with the alkaline aqueous solution will be wide so that the sacrificial yarn will be easily eluted in the alkaline aqueous solution in step (ii).

In a case where a sacrificial yarn is a multifilament, the number of filaments per one sacrificial yarn is preferably 2 to 32, more preferably from 2 to 16, further preferably from 2 to 8. When the number of filaments is at least the above lower limit value, the sacrificial yarn will be easily eluted in the alkaline aqueous solution in step (ii). When the number of filaments is at most the above upper limit value, the fineness of the sacrificial yarn will not be larger than necessary.

The fineness of sacrificial yarns prior to step (i) is preferably from 7 to 100 deniers, more preferably from 9 to 60 deniers, further preferably from 12 to 40 denier. When the fineness of sacrificial yarns is at least the above lower limit value, the mechanical strength will be sufficiently high, and at the same time, the weaving properties will be sufficiently high. When the fineness of sacrificial yarns is at most the above upper limit value, holes formed after dissolution of sacrificial yarns will not be too close to the surface of the electrolyte membrane, cracking is less likely to occur at the surface of the electrolyte membrane, and as a result, decrease in the mechanical strength can be prevented.

(Elution Portions)

The ion exchange membrane of the present invention has, in the layer (S), elution portions formed by elution of at least part of the material of sacrificial yarns during said step (i) and step (ii). In a case where the sacrificial yarn is a multifilament composed of two or more filaments, at least part of the material of the multifilament will be eluted to form an elution portion consisting of a collection of two or more holes. In a case where the sacrificial yarn is made of a monofilament, an elution portion consisting of one hole wherein at least part of the material of the monofilament is eluted, will be formed. In a case where in step (i), a portion of the sacrificial yarn has remained without being eluted, the remaining sacrifice yarn is present in the elution portion.

In the ion exchange membrane, it is preferred that even after step (i), part of the sacrificial yarn will remain so that an elution portion is formed around the sacrificial yarn filaments. Thus, breakage such as cracking tends to be less likely to occur in the ion exchange membrane during handling of the ion exchange membrane after preparation of the ion exchange membrane before the conditioning operation of the alkali chloride electrolysis, or during installation of the ion exchange membrane in an electrolytic cell for the conditioning operation.

Even if a portion of sacrificial yarns remains after step (i), the sacrificial yarns will be mostly or preferably entirely eluted and removed in the alkaline aqueous solution during step (ii) and, therefore, will present no influence to the membrane resistance at the time of the main operation of alkali chloride electrolysis using the ion exchange membrane. After the ion exchange membrane is installed in the electrolytic cell, no large force may be exerted from outside to the ion exchange membrane, and, therefore, even if the sacrificial yarns are completely eluted and removed in the alkaline aqueous solution, breakage such as cracking is less likely to occur in the ion exchange membrane.

In the present invention, all of sacrificial yarns may be eluted during step (i) to form elution portions wherein no sacrificial yarns remain, before conducting step (ii).

In a cross section perpendicular to the length direction of the reinforcing yarns of the ion exchange membrane, the total area (P) obtained by adding the cross sectional area of an elution portion and the cross sectional area of a sacrificial yarn remaining in the elution portion is from 500 to 5,000 $\mu m^2$, preferably from 1,000 to 5,000 $\mu m^2$, more preferably from 1,000 to 4,000 $\mu m^2$, particularly preferably from 1,000 to 3,000 $\mu m^2$. When the total area (P) is at least the above lower limit value, the reinforcing fabric can be prepared without causing yarn breakage of the sacrificial yarns during weaving, and it is possible to reduce the electrolysis voltage at the time of alkali chloride electrolysis. When the total area (P) is at most the above upper limit value, it is possible to fit the sacrificial yarns between the reinforcing yarns at the time of weaving, and it is possible to reduce the electrolysis voltage at the time of alkali chloride electrolysis.

The total area (P) is measured by using an imaging software by observing the cross section of the ion exchange membrane dried at 90° C. over 2 hours by an optical electron microscope.

In the present invention, in a cross section perpendicular to the length direction of the reinforcing yarns, the total area (P) is in the above range. A cross section perpendicular to the length direction of the reinforcing yarns means at least one cross section selected from the group consisting of a cross section (hereinafter referred to as "MD cross section") cut perpendicular to the MD direction of the ion exchange membrane and a cross section (hereinafter referred to as "TD cross section") cut perpendicular to the TD direction of the ion exchange membrane. That is, at least one total area (P) among the total area (P) in the MD cross section and the total area (P) in the TD cross section, is within the above range.

Further, the MD cross section of the ion exchange membrane in the present invention is preferably a cross section which does not overlap with the reinforcing yarns, the sacrificial yarns and elution holes which are disposed perpendicular to the MD direction in the reinforcing material embedded in the ion exchange membrane. The same applies to the TD cross section.

The total area (P) in the cross section of the present invention is more preferably such that the average value of the total area (P) in the MD cross section and the total area (P) in the TD cross section is within the above range, further preferably such that both of the total area (P) in the MD cross section and the total area (P) in the TD cross section are within the above range.

The total area (P) in the MD cross section can be obtained by measuring the total area (P) with respect to elution holes at 10 locations randomly selected in the MD cross section of an ion exchange membrane, and obtaining the average value thereof. The total area (P) in the TD cross section can also be obtained in the same manner.

In an ion exchange membrane, in a case where a sacrificial yarn is completely dissolved, the total area (P) is the cross sectional area of the elution hole, and in a case where a sacrificial yarn remaining undissolved is present in an elution hole, the total area (P) is a total area obtained by adding the cross-sectional area of the elution hole and the cross-sectional area of the sacrificial yarn remaining undissolved.

In a cross section perpendicular to the length direction of the reinforcing yarns in the ion exchange membrane, the average number (n) of elution portions between adjacent reinforcing yarns is from 4 to 6, particularly preferably 4. When the average number (n) of elution portions is from 4 to 6, it is possible to reduce the electrolysis voltage at the time of alkali chloride electrolysis, while increasing the membrane strength. Here, an elution hole formed from one sacrificial yarn made of a multifilament is counted as 1.

In a cross section perpendicular to the length direction of the reinforcing yarns in the ion exchange membrane, the average distance (d2) from the center of an elution portion to the center of the adjacent elution portion preferably satisfies the relation of the following formula (1), more preferably satisfies the relation of the following formula (1-1), further preferably satisfies the relation of the following formula (1-2). Thereby, it becomes easy to obtain the effect of reducing the electrolysis voltage at the time of alkali chloride electrolysis, while increasing the membrane strength.

$$0.5 \leq \{d2/d1 \times (n+1)\} \leq 1.5 \tag{1}$$

$$0.7 \leq \{d2/d1 \times (n+1)\} \leq 1.4 \tag{1-1}$$

$$0.8 \leq \{d2/d1 \times (n+1)\} \leq 1.2 \tag{1-2}$$

Here, d1: the average distance from the center of a reinforcing yarn to the center of the adjacent reinforcing yarn, d2: the average distance from the center of an elution hole to the center of the adjacent elution hole, n: number of elution holes between adjacent reinforcing yarns.

In the present invention, it is preferred that in a cross section perpendicular to the length direction of the reinforcing yarns, the average distance (d1) and the average distance (d2) satisfy the relations of the above formulae. A cross section perpendicular to the length direction of the reinforcing yarns means at least one cross section selected from the MD cross section and the TD cross section of the ion exchange membrane. That is, the average distance (d1) and the average distance (d2) in at least one cross section selected from the MD cross section and the TD cross section preferably satisfy the relations of the above formulae.

In the present invention, it is preferred that an average value of the average distance (d1) in the MD cross section and the average distance (d1) in the TD cross section, and an average value of the average distance (d2) in the MD cross section and the average distance (d2) in the TD cross section, satisfy the above formulae, and it is more preferred that in both the MD cross section and the TD cross section, the average distance (d1) and the average distance (d2) satisfy the relations of the above formulae.

The values of the average distance (d1) and the average distance (d2) in the MD cross section, are obtainable by measuring, in the MD cross section of the ion exchange membrane, the average distance (d1) and the average distance (d2), respectively, at 10 locations randomly selected, and obtaining the respective average values. The average distance (d1) and the average distance (d2) in the TD cross section are obtainable in the same manner.

In the present invention, in a cross section perpendicular to the length direction of the reinforcing yarns in the ion exchange membrane, the distance (d2') from the center of an elution portion to the center of the adjacent elution portion preferably satisfies the relation of the following formula (1'), more preferably satisfies the relation of the following formula (1'-1), further preferably satisfies the relation of following formula (1'-2), at all of measurement points measured to determine the average distance (d2). Thereby, it becomes easy to obtain the effect of reducing the electrolysis voltage at the time of alkali chloride electrolysis, while increasing the membrane strength. Here, in the distance d2', all of the measurement points measured to determine the average distance (d2) means all of the measurement points measured to calculate the above-mentioned average distance (d2). Specifically, in the MD cross section or the TD cross section, they mean the measurement points at 10 locations measured to obtain the average distance (d2).

$$0.5 \leq \{d2'/d1 \times (n+1)\} \leq 1.5 \tag{1'}$$

$$0.7 \leq \{d2'/d1 \times (n+1)\} \leq 1.4 \tag{1'-1}$$

$$0.8 \leq \{d2'/d1 \times (n+1)\} \leq 1.2 \tag{1'-2}$$

Here, the symbols in the formulae have the following meanings.

d2': the distance from the center of an elution portion to the center of the adjacent elution portion.

d1 and n: the same as above.

Further, in a cross section perpendicular to the length direction of the reinforcing yarns in the ion exchange membrane, the average distance (d3) from the center of a reinforcing yarn to the center of the adjacent elution portion preferably satisfy the relation of the following formula (2), more preferably satisfy the relation of the following (2-1), further preferably satisfies the relation of the following formula (2-2). Thereby, it becomes easy to obtain the effect of reducing the electrolysis voltage at the time of alkali chloride electrolysis, while increasing the membrane strength.

$$0.5 \leq \{d3/d1 \times (n+1)\} \leq 1.5 \tag{2}$$

$$0.8 \leq \{d3/d1 \times (n+1)\} \leq 1.5 \tag{2-1}$$

$$0.9 \leq \{d3/d1 \times (n+1)\} \leq 1.4 \tag{2-2}$$

Here, the symbols in the formulae have the following meanings.

d3: the average distance from the center of a reinforcing yarn to the center of the adjacent elution portion.

d1 and n: the same as above.

In the present invention, in a cross section perpendicular to the length direction of the reinforcing yarns, the average distance (d1) and the average distance (d3) preferably satisfy the relation of the above formulae. A cross section perpendicular to the length direction of the reinforcing yarns means at least one cross section of the MD cross section or the TD cross section of the ion exchange membrane. That is, the average distance (d1) and the average distance (d3) of at least one cross section selected from the MD cross section and the TD cross section preferably satisfy the relations of the above formulae.

In the present invention, it is preferred that an average value of the average distance (d1) in the MD cross section and the average distance (d1) in the TD cross section, and an average value of the average distance (d3) in the MD cross section and the average distance (d3) in the TD cross section, satisfy the above formulae, and it is more preferred that in both the MD cross section and the TD cross section, the average distance (d1) and the average distance (d3) satisfy the relations of the above formulae.

The values of the average distance (d1) and the average distance (d3) in the MD cross section are obtainable by measuring the average distance (d1) and the average distance (d3) at 10 locations randomly selected in the MD cross section of the ion exchange membrane, and obtaining the respective average values. The average distance (d1) and the average distance (d3) in the TD cross section may be obtained in the same manner.

In the present invention, in a cross section perpendicular to the longitudinal direction of the reinforcing yarns in the ion exchange membrane, the distance d3' from a center of the reinforcing yarn to the center of the adjacent elution portion, preferably satisfies the relation of the following formula (2'), more preferably satisfies the relation of the following formula (2'-1), further preferably satisfies the relationship of the following formula (2'-2), at all of measurement points measured to determine the average distance (d3). Thereby, it becomes easy to obtain the effect of reducing the electrolysis voltage at the time of alkali chloride electrolysis, while increasing the membrane strength. Here, in the distance d3', all of the measurement points measured to determine the average distance (d3) means all of the measurement points measured to calculate the above-mentioned average distance (d3). Specifically, in the MD cross section or the TD cross section, they mean the measurement points at 10 locations measured to obtain the average distance (d3).

$$0.5 \leq \{d3'/d1 \times (n+1)\} \leq 1.5 \quad (2')$$

$$0.8 \leq \{d3'/d1 \times (n+1)\} \leq 1.5 \quad (2'\text{-}1)$$

$$0.9 \leq \{d3'/d1 \times (n+1)\} \leq 1.4 \quad (2'\text{-}2)$$

Here, the symbols in the formulae have the following meanings.

d3': the distance from the center of a reinforcing yarn to the center of the adjacent elution portion.

d1 and n: the same as above.

[Production Method]

An example of the method for producing an ion exchange membrane will be described with reference to a case of an ion exchange membrane comprising a layer (Sa), a reinforcing fabric, a layer (Sb) and a layer (C), as shown in FIG. 1. The ion exchange membrane may be produced, for example, via the following steps (a) and step (b).

Step (a): a step of obtaining a reinforced precursor membrane having a precursor membrane comprising a fluorinated polymer having groups convertible to ion exchange groups, reinforced by a reinforcing fabric made of reinforcing yarns and sacrificial yarns.

Step (b): a step of contacting the reinforced precursor membrane with an alkaline aqueous solution to hydrolyze the precursor groups to convert them to ion exchange groups, thereby to obtain an ion exchange membrane.

(Step (a))

By a coextrusion method, a laminated membrane of a precursor layer (C') made of a fluorinated polymer having groups convertible to carboxylic acid functional groups and a precursor layer (S'1) made of a fluorinated polymer having groups convertible to sulfonic acid functional groups, is obtained.

Separately, by a single layer extrusion method, a precursor layer (S'2) made of a fluorinated polymer having groups convertible to sulfonic acid functional groups, is obtained.

Then, the precursor layer (52), a reinforcing fabric, and the laminated membrane of the precursor layer (S'1) and the precursor layer (C') are disposed in this order, and laminated by means of a laminating roll or vacuum laminating apparatus to obtain a reinforced precursor membrane. At that time, the laminated membrane of the precursor layer (S'1) and the precursor layer (C'), is disposed so that the precursor layer (S'1) is in contact with the reinforcing fabric. By subjecting the reinforced precursor membrane to hydrolysis treatment, the precursor layer (S'1) will be the layer (Sb), and the precursor layer (S'2) will be the layer (Sa), whereby an ion exchange membrane wherein the layer (Sa), the reinforcing material, the layer (Sb) and the layer (C) are laminated in this order, is obtainable.

(Fluorinated Polymer Having Groups Convertible to Carboxylic Acid Functional Groups)

The fluorinated polymer having groups convertible to carboxylic acid functional groups may, for example, be a copolymer having units derived from a fluorinated monomer having a group convertible to a carboxylic acid functional group and units derived from a fluorinated olefin.

The fluorinated monomer having a group convertible to a carboxylic acid functional group, is not particularly limited, so long as it is a compound having one or more fluorine atoms in the molecule and having an ethylenic double bond and a group convertible to a carboxylic acid functional group, and it is possible to use a conventionally known one.

As the fluorinated monomer having a group convertible to a carboxylic acid functional group, a monomer represented by the following formula (3) is preferred from the viewpoint of the production cost of the monomer, reactivity with other monomers, and excellent properties of the resulting fluorinated polymer.

(3)

In the formula (3), X is a fluorine atom or a trifluoromethyl group. Further, X is a fluorine atom or a trifluoromethyl group. In a case where both X and X' are present in one molecule, they may be the same or may be different.

$A^1$ is a group convertible to a carboxylic acid functional group. The group convertible to a carboxylic acid functional group is a functional group capable of being converted to a carboxylic acid functional group by hydrolysis. The functional group that can be converted to a carboxylic acid functional group may, for example, be —CN, —COF, —COOR$^1$ (wherein R$^1$ is an alkyl group having from 1 to 10 carbon atoms) or —COONR$^2$R$^3$ (wherein R$^2$ and R$^3$ are each a hydrogen atom or an alkyl group having from 1 to 10 carbon atoms, and R$^2$ and R$^3$ may be the same or may be different).

p is 0 or 1, q is an integer from 0 to 12, r is an integer of from 0 to 3, s is 0 or 1, t is an integer from 0 to 12, and u is an integer of from 0 to 3. However, p and s are not 0 at the same time, and r and u are not 0 at the same time. That is, 1≤p+s, and 1≤r+u.

As specific examples of the monomer represented by the formula (3), the following compounds may be mentioned, and from the viewpoint of easy production, compounds wherein p=1, q=0, r=1, s=0 to 1, t=1 to 3, and u=0 to 1 are preferred.

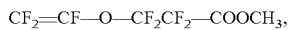

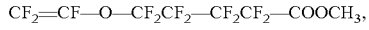

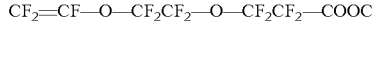

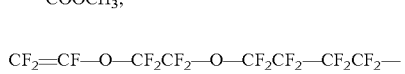

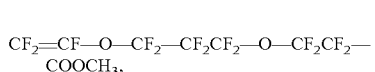

CF$_2$=CF—O—CF$_2$CF(CF$_3$)—O—CF$_2$CF$_2$—COOCH$_3$,

CF$_2$=CF—O—CF$_2$CF(CF$_3$)—O—CF$_2$—CF$_2$CF$_2$—COOCH$_2$.

As the fluorinated monomer having a group convertible to a carboxylic acid functional group, one type may be used alone, or two or more types may be used in combination.

The fluorinated olefin may, for example, be a C$_{2\text{-}3}$ fluoroolefin having one or more fluorine atoms in the molecule. As the fluoroolefin, tetrafluoroethylene (CF$_2$=CF$_2$) (hereinafter referred to as TFE), chlorotrifluoroethylene (CF$_2$=CFCl), vinylidene fluoride (CF$_2$=CH$_2$), vinyl fluoride (CH$_2$=CHF), hexafluoropropylene (CF$_2$=CFCF$_3$), etc. may be mentioned. Among them, TFE is particularly preferred from the viewpoint of the production cost of the monomer, reactivity with other monomers, and excellent properties of the resulting fluorinated polymer. As the fluorinated olefin, one type may be used alone, or two or more types may be used in combination.

In the present invention, for the fluorinated polymer to form the layer (C), in addition to the fluorinated monomer having a group convertible to a carboxylic acid functional group, and the fluorinated olefin, other monomers may be further used. Other monomers may, for example, be CF$_2$=CF$_2$—R$^f$, CF$_2$=CF—OR$^f$ (wherein R$^f$ is a perfluoroalkyl group having from 1 to 10 carbon atoms), CF$_2$=CFO(CF$_2$)$_v$CF=CF$_2$ (wherein v is an integer of from 1 to 3), etc. By copolymerizing such other monomers, it is possible to improve the flexibility and mechanical strength of the ion exchange membrane. The proportion of such other monomers is preferably at most 30 mass % in the total monomers (100 mass %), with a view to maintaining the ion exchange performance.

The molecular weight of the fluorinated polymer having groups convertible to carboxylic acid functional groups is, by the TQ value, preferably 150° C., more preferably from 170 to 340° C., further preferably from 170 to 300° C., from the viewpoint of the mechanical strength and film-forming properties as an ion exchange membrane.

(Fluorinated Polymer Having Groups Convertible to Sulfonic Acid Functional Groups)

The fluorinated polymer having groups convertible to sulfonic acid functional groups may, for example, be a copolymer having units derived from a fluorinated monomer having a group convertible to a sulfonic acid functional group and units derived from a fluorinated olefin.

The fluorinated monomer having a group convertible to a sulfonic acid functional group, is not particularly limited so long as it is a monomer having one or more fluorine atoms in the molecule, an ethylenic double bond and a group convertible to a sulfonic acid functional group, and it is possible to use a conventionally known one.

As the fluorinated monomer having a group convertible to a sulfonic acid functional group, from the viewpoint of the production cost of the monomer, reactivity with other monomers and excellent properties of the resulting fluoropolymer, preferred is a monomer represented by the following formula (4) or a monomer represented by the following formula (5).

CF$_2$=CF—O—R$^{f2}$-A$^2$   (4),

CF$_2$=CF—R$^{f2}$-A$^2$   (5).

R$^{f2}$ is a perfluoroalkylene group having from 1 to 20 carbon atoms, which may contain an etheric oxygen atom and may be straight-chained or branched.

A$^2$ is a group convertible to a sulfonic acid functional group. The group convertible to a sulfonic acid functional group is a functional group capable of being converted to a sulfonic acid functional group by hydrolysis. The functional group convertible to a sulfonic acid functional group may, for example, be —SO$_2$F, —SO$_2$Cl, —SO$_2$Br, etc.

As the monomer represented by the formula (4), specifically, the following monomers are preferred.

CF$_2$=CF—O—(CF$_2$)$_a$—SO$_2$F (wherein a is an integer of from 1 to 8),

CF$_2$=CF—O—CF$_2$CF(CF$_3$)O(CF$_2$)$_a$—SO$_2$F (wherein a is an integer of from 1 to 8), CF$_2$=CF[OCF$_2$CF(CF$_3$)]$_a$SO$_2$F (wherein a is an integer of from 1 to 5).

As the monomer represented by the formula (5), specifically, the following monomers are preferred.

CF$_2$=CF(CF$_2$)$_b$—SO$_2$F (wherein b is an integer of from 0 to 8),

CF$_2$=CF—CF$_2$—O—(CF$_2$)$_b$—SO$_2$F (wherein b is an integer of from 1 to 8)

As the fluorinated monomer having a group convertible to a sulfonic acid functional group, from such a viewpoint that industrial synthesis is easy, preferred are the following monomers.

CF$_2$=CFOCF$_2$CF$_2$SO$_2$F,

CF$_2$=CFOCF$_2$CF$_2$CF$_2$SO$_2$F,

CF$_2$=CFOCF$_2$CF$_2$CF$_2$CF$_2$SO$_2$F,

CF$_2$=CFOCF$_2$CF(CF$_3$)OCF$_2$CF$_2$SO$_2$F,

CF$_2$=CFOCF$_2$CF(CF$_3$)OCF$_2$CF$_2$CF$_2$SO$_2$F,

CF$_2$=CFOCF$_2$CF(CF$_3$)SO$_2$F,

CF$_2$=CFCF$_2$CF$_2$SO$_2$F,

CF$_2$=CFCF$_2$CF$_2$CF$_2$SO$_2$F,

CF$_2$=CF—CF$_2$—O—CF$_2$CF$_2$—SO$_2$F.

As the fluorinated monomer having a group convertible to a sulfonic acid functional groups, one type may be used alone, or two or more may be used in combination.

As the fluorinated olefin, those exemplified above may be mentioned, and from the viewpoint of the production cost of the monomer, reactivity with other monomers and excellent properties of the resulting fluoropolymer, TFE is particularly preferred. As the fluorinated olefin, one type may be used alone, or two or more types may be used in combination.

In the present invention, for the fluorinated polymer to form a layer (S), other monomers may further be used in addition to the fluorinated monomer having a group convertible to a sulfonic acid functional group, and the fluorinated olefin. As such other monomers, those exemplified above may be mentioned. By copolymerizing such other monomers, it is possible to improve the flexibility and mechanical strength of the ion exchange membrane. The proportion of other monomers is preferably at most 30 mass % in the total monomers (100 mass %), with a view to maintaining the ion exchange performance.

The molecular weight of the fluorinated polymer having groups convertible to sulfonic acid functional groups is, by the TQ value, preferably at least 150° C., more preferably from 170 to 340° C., further preferably from 170 to 300° C., from the viewpoint of the mechanical strength and film-forming properties as an ion exchange membrane.

(Step (b))

The reinforced precursor membrane thus obtained, is subjected to hydrolysis to convert groups convertible to carboxylic acid groups and groups convertible to sulfonic acid functional groups, respectively to the carboxylic acid functional groups and the sulfonic acid functional groups, thereby to obtain an ion exchange membrane. The method for hydrolysis may, for example, be preferably a method of using a mixture of a water-soluble organic compound and a hydroxide of an alkali metal, as described in JP-A-1-140987.

In step (b), it is preferred that by contacting the reinforced precursor membrane with an alkaline aqueous solution, at least a portion of the sacrificial yarns is hydrolyzed and eluted in the alkaline aqueous solution.

<Alkali Chloride Electrolysis Apparatus>

Figure 3:
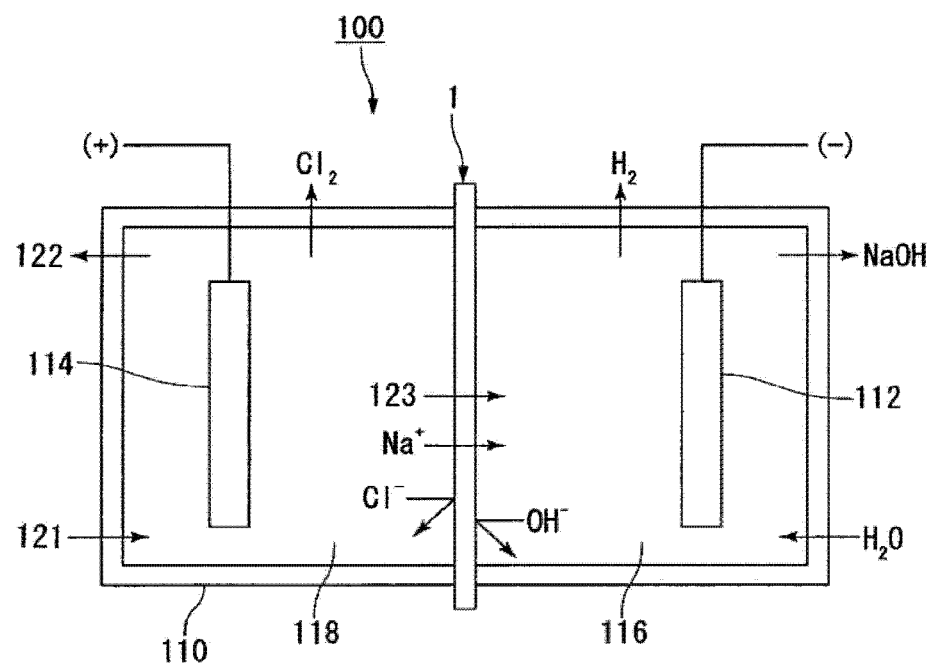
FIG. 3 is a schematic diagram showing an example of the alkali chloride electrolysis apparatus of the present invention.

For the alkali chloride electrolysis apparatus of the present invention, a known embodiment may be employed except for using the ion exchange membrane for alkali chloride electrolysis of the present invention. FIG. 3 is a schematic diagram showing an example of the alkali chloride electrolysis apparatus of the present invention.

The alkali chloride electrolysis apparatus 100 of this embodiment comprises an electrolytic cell 110 provided with a cathode 112 and an anode 114, and an ion-exchange membrane 1 installed in the electrolytic cell 110 so as to partition inside of the electrolytic cell 110 into a cathode chamber 116 on the cathode 112 side and an anode chamber 118 on the anode 114 side.

The ion exchange membrane 1 is installed in the electrolytic cell 110 so that the layer (C) 12 is located on the cathode 112 side, and the layer (Sa) of the layer (S) 14 is located on the anode 114 side.

The cathode 112 may be disposed in contact with the ion exchange membrane 1, or may be disposed as spaced from the ion exchange membrane 1.

As the material constituting the cathode chamber 116, preferred is a material which is resistant to sodium hydroxide and hydrogen. As such a material, stainless steel, nickel, etc. may be mentioned. As the material constituting the anode chamber 118, preferred is a material which is resistant to sodium chloride and chlorine. As such a material, titanium may be mentioned.

For the cathode material, stainless steel or nickel is preferably used as the substrate material, and an Ni—S alloy, Raney Ni, NiO, an Ni—Sn alloy, a platinum group element such as Pt or Ru is used as the electrode catalyst layer, and for the material of the anode, titanium, etc. having an oxide coating layer is preferably used.

For example, in the case of producing a sodium hydroxide aqueous solution by electrolyzing a potassium chloride aqueous solution, by supplying a sodium chloride aqueous solution to the anode chamber 118 in the alkali chloride electrolysis apparatus 100, and supplying a potassium hydroxide aqueous solution to the cathode chamber 116, the sodium chloride aqueous solution is electrolyzed while maintaining the concentration of the sodium hydroxide aqueous solution discharged from the cathode chamber 116 at a predetermined concentration (e.g. 32 mass %).

EXAMPLES

In the following, the present invention will be described in detail with reference to Examples, but the present invention is not limited by the following description. Ex. 1 to 3 are Examples of the present invention, and Ex. 4 to 8 are Comparative Examples.

(TQ Value)

The TQ value is a value related to the molecular weight of a polymer and was determined as a temperature at which the volume flow rate would be 100 mm$^3$/sec. The volume flow rate is a flow out amount (unit: mm$^3$/sec) when a fluorinated polymer having groups convertible to ion exchange groups, is melted and permitted to flow out from an orifice (diameter: 1 mm, length: 1 mm) under a pressure of 3 MPa by using Shimadzu Flow Tester CFD-100D (manufactured by Shimadzu Corporation).

(Ion Exchange Capacity)

About 0.5 g of a fluorinated polymer having groups convertible to ion exchange groups was formed into a film by flat pressing at a temperature higher by about 10° C. than its TQ value, and then, the obtained film-like sample was analyzed by a transmission infrared spectroscopy apparatus. By using the respective peak heights of the $CF_2$ peak, $CH_3$ peak, OH peak, CF peak and $SO_2F$ peak of the obtained spectrum, the proportion of units having groups convertible to carboxylic acid functional groups or groups convertible to sulfonic acid functional groups, was calculated, whereupon by using this as the proportion of units having groups convertible to carboxylic acid functional groups or groups convertible to sulfonic acid functional groups in the fluorinated polymer obtainable after the hydrolysis treatment, the ion exchange capacity was obtained from a calculation curve of samples, of which ion exchange capacities are known.

Further, also with respect to a film having ion exchange groups, in which the terminal group is an acid-type, or K-type or Na type, the measurement may be made in the same manner.

(Distance of Reinforcing Yarns and Elution Portions)

By observing a cross section of an ion exchange membrane dried at 90° C. for at least 2 hours by an optical microscope, and by using imaging software (Pixs2000 PRO, manufactured by Innotech Corporation), the distance from the center of a reinforcing yarn to the center of the adjacent reinforcing yarn was measured at 10 locations in each of the MD cross-section (cross section cut perpendicular to the MD direction) and the TD cross-section (cross section cut perpendicular to the TD direction), and from their average, the average value d1 was determined. Also, the average values d2 and d3 were obtained in the same manner.

Here, the average values d1 to 3 are values of the reinforcing fabric disposed in an ion exchange membrane produced via steps (a) and (b) and thus are different from the values after weaving i.e. prior to via step (a) and (b).

(Method for Measuring Cross-Sectional Area)

In the atmosphere, by observing a cross section cut perpendicular to the length direction of the reinforcing yarns of an ion exchange membrane dried at 90° C. for at least 2 hours, by an optical microscope, the total area (P) obtained by adding the cross-sectional area of an elution portion and the cross-sectional area of a sacrificial yarn remaining in the elution portion, was measured by using an imaging software (Pixs2000 PRO, manufactured by Innotech Corporation). The total area (P) was measured at 10 locations selected at random in each of the MD cross section and the TD cross section. With respect to the MD cross section, the total cross-sectional area (S) was obtained as an average value of the measured values at 10 locations. Also with respect to the TD cross section, the total area (S) was obtained in the same manner.

In a case where a sacrificial yarn is completely dissolved, the total area (S) is the cross-sectional area of the elution hole, and in a case where a sacrificial yarn remaining undissolved is present in an elution hole, the total area (S)

is a value obtained by adding the cross-sectional area of the elution hole and the cross-sectional area of the sacrificial yarn remaining undissolved.

(Method for Measuring Width of Reinforcing Yarn)

In the atmosphere, by observing a cross section of an ion exchange membrane dried at 90° C. for at least 2 hours by an optical microscope, and by using an imaging software (Pixs2000 PRO, manufactured by Innotech Corporation), the width of a reinforcing yarn as viewed from a direction perpendicular to the fabric surface of the reinforcing fabric (the direction perpendicular to the surface) was measured. The width of the reinforcing yarn was measured at 10 locations in each of the MD cross section and the TD cross section. With respect to the MD cross section, the width of the reinforcing fiber was obtained as an average value of the measured values at 10 locations. Also with respect to the TD cross section, the width of the reinforcing yarn was obtained in the same manner.

(Method for Measuring Electrolysis Voltage)

The ion exchange membrane was installed in a test electrolytic cell with an effective current-carrying area of 1.5 dm² (electrolytic surface size: vertical 150 mm×horizontal 100 mm) so that the layer (C) faced the cathode, and by using, as an anode, punched metal of titanium (short diameter: 4 mm, long diameter: 8 mm) coated with a solid solution of ruthenium oxide, iridium oxide and titanium oxide, and, as a cathode, SUS304 punched metal (short diameter: 5 mm, long diameter: 10 mm) having ruthenium-containing Raney nickel electrodeposited thereon, they were installed so that the electrodes and the membrane were in direct contact so as not to form a gap.

While adjusting the concentration of sodium hydroxide discharged from the cathode chamber to be 32 mass % and the concentration of sodium chloride supplied to the anode chamber to be 200 g/L, electrolysis of a sodium chloride aqueous solution was conducted under the conditions of a temperature of 90° C. and a current density of 6 kA/m², and the electrolysis voltage (V) and current efficiency (%) were measured after 3 to 10 days from the initiation of operation.

(Method for Measuring Aperture Ratio)

For the aperture ratio, in the atmospheric air, a cross section cut perpendicular to the length direction of the reinforcing yarns of an ion exchange membrane dried at 90° C. for at least 2 hours, was observed by an optical microscope, and by using an imaging software (Pixs2000 PRO, manufactured by Innotech Corporation), the aperture ratio was calculated. For the calculation, in each of the MD cross section (cross section cut perpendicular to the MD direction) and the TD cross section (cross section cut perpendicular to the TD direction), the distance from the center of a reinforcing yarn to the center of the adjacent reinforcing yarn, and the width of a yarn, were measured at 10 locations, respectively, whereupon the aperture ratio was calculated from the following formula.

{(Distance between reinforcing yarns in the MD cross section–width of reinforcing yarn in the MD cross section)×(distance between reinforcing yarns in the TD cross section–width of reinforcing yarn in the TD cross section)}/{(distance between reinforcing yarns in the MD cross section)×(distance between reinforcing yarns in the TD cross section)}×100

Ex. 1

TFE and a fluorinated monomer having a group convertible to a carboxylic acid functional group represented by the following formula (3-1) were copolymerized to synthesize a fluorinated polymer having groups convertible to carboxylic acid functional groups (ion exchange capacity: 1.06 meq/g dry resin, TQ: 225° C.) (hereinafter referred to as polymer C).

$$CF_2=CF-O-CF_2CF_2-CF_2-COOCH_3 \quad (3-1)$$

TFE and a fluorinated monomer having a group convertible to a sulfonic acid functional group represented by the following formula (4-1) were copolymerized to synthesize a fluorinated polymer having groups convertible to sulfonic acid functional groups (ion exchange capacity: 1.1 meq/g dry resin, TQ: 235° C.) (hereinafter referred to as polymer S1). Similarly, TFE and a fluorinated monomer having a group convertible to a sulfonic acid functional group represented by the following formula (4-1) were copolymerized to synthesize a fluorinated polymer having groups convertible to sulfonic acid functional groups (ion exchange capacity: 1.25 meq/g dry resin, TQ: 235° C.) (hereinafter referred to as polymer S2).

$$CF_2=CF-O-CF_2CF(CF_3)-O-CF_2CF_2-SO_2F \quad (4-1)$$

The polymer C and the polymer S1 were molded by a coextrusion method to obtain a film A of a two layer structure with a precursor layer (C') (thickness: 12 µm) made of the polymer C and a precursor layer (S'1) (thickness: 68 µm) made of the polymer S1.

Further, the polymer S2 was molded by a melt extrusion method to obtain a film B (thickness: 30 µm) to become a precursor layer (S'2).

A PTFE film was rapidly stretched and then slit to a thickness of 100 denier to obtain a monofilament, which was twisted 2,000 times/m to obtain a PTFE yarn, which was used as a reinforcing yarn. A PET yarn made of a multifilament of 18 denier having two PET filaments of 9 denier stretch-assembled, was used as a sacrificial yarn. Plain weaving was conducted so that one reinforcing yarn and four sacrificial yarns would be alternately arranged, to obtain a reinforcing fabric (density of reinforcing yarns: 27 yarns/inch, density of sacrificial yarns: 108 yarns/inch).

The film B, the reinforcing fabric, the film A and a release PET film (thickness: 100 µm) were overlaid in this order so that the precursor layer (C') of the film A was located on the release PET film side, and laminated by using a roll. The release PET film was peeled off to obtain a reinforced precursor membrane.

A paste comprising 29.0 mass % of zirconium oxide (average particle diameter: 1 µm), 1.3 mass % of methyl cellulose, 4.6 mass % of cyclohexanol, 1.5 mass % of cyclohexane and 63.6 mass % of water, was transferred by a roll press on the upper side of the precursor layer (S'2) of the reinforced precursor membrane, to form a gas-releasing coating layer. The attached amount of zirconium oxide was 20 g/m².

The reinforced precursor membrane having the gas-releasing coating layer formed on one side, was immersed in an aqueous solution containing 5 mass % of dim ethyl sulfoxide and 30 mass % of potassium hydroxide at 95° C. for 8 minutes. Thereby, —COOCH₃ of the polymer C and —SO₂F of the polymers S1 and the polymer S2 were hydrolyzed and converted to ion exchange groups, to obtain a membrane having the precursor layer (C') as the layer (C), and the precursor layer (S'1) and the precursor layer (S'2), respectively, as the layer (S1) and the layer (S2).

In an ethanol solution containing 2.5 mass % of an acid-from polymer of polymer S1, zirconium oxide (average particle diameter: 1 µm) was dispersed at a concentration of 13 mass %, to prepare a dispersion. The dispersion was sprayed on the layer (C) side of the above membrane, to form a gas-releasing coating layer, to obtain an ion exchange membrane having gas-releasing coating layers formed on both surfaces. The attached amount of zirconium oxide was 3 g/m².

Ex. 2

TFE and a fluorinated monomer having a group convertible to a sulfonic acid functional group represented by the above formula (4-1) were copolymerized to synthesize a fluorinated polymer having groups convertible to sulfonic acid functional groups (ion exchange capacity: 1.30 meq/g dry resin, TQ: 235° C.) (hereinafter referred to as polymer S3).

An ion exchange membrane was obtained in the same manner as in Ex. 1, except that the polymer S2 was changed to the polymer S3.

Ex. 3

An ion exchange membrane was obtained in the same manner as in Ex. 1, except that as the sacrificial yarn, a PET yarn made of a multifilament of 32 denier having two PET filaments of 16 denier stretch-assembled, was used, and the polymer S2 was changed to the polymer S3.

Ex. 4

An ion exchange membrane was obtained in the same manner as in Ex. 1, except that as the sacrificial yarn, a PET yarn made of a multifilament of 30 denier having six monofilaments of 5 denier stretch-assembled, was used, in the reinforcing fabric, the density of reinforcing yarns was made to be 27 yarns/inch and the density of sacrificial yarns was made to be 54 yarns/inch, and further, the polymer S2 was changed to the polymer S1.

Ex. 5

An ion exchange membrane was obtained in the same manner as in Ex. 1, except that as the sacrificial yarn, a PET yarn made of a multifilament of 30 denier having six monofilaments of 5 denier stretch-assembled, was used, in the reinforcing fabric, the density of reinforcing yarns was made to be 27 yarns/inch and the density of sacrificial yarns was made to be 54 yarns/inch.

Ex. 6

An ion exchange membrane was obtained in the same manner as in Ex. 1, except that as the sacrificial yarn, a PET yarn made of a multifilament of 30 denier having six monofilaments of 5 denier stretch-assembled, was used, in the reinforcing fabric, the density of reinforcing yarns was made to be 27 yarns/inch and the density of sacrificial yarns was made to be 54 yarns/inch, and further, the polymer S2 was changed to the polymer S3.

Ex. 7

An ion exchange membrane was obtained in the same manner as in Ex. 1, except that the polymer S2 was changed to the polymer S1.

Ex. 8

An ion exchange membrane was obtained in the same manner as in Ex. 1, except that as the sacrificial yarn, a PET yarn made of a multifilament of 32 denier having two PET filaments of 16 denier stretch-assembled, was used, and the polymer S2 was changed to the polymer S1.

The results of measurements of the average distances d1 to d3, the total area (P), the width of reinforcing yarn, and the electrolysis voltage, of the ion exchange membrane in each Ex, are shown in Table 1.

TABLE 1

| | | Ex. 1 | Ex. 2 | Ex. 3 | Ex. 4 | Ex. 5 | Ex. 6 | Ex. 7 | Ex. 8 |
|---|---|---|---|---|---|---|---|---|---|
| Reinforcing yarn | Fineness [denier] | 100 | 100 | 100 | 100 | 100 | 100 | 100 | 100 |
| | Filaments [number] | 1 | 1 | 1 | 1 | 1 | 1 | 1 | 1 |
| | Density of yarns [number/inch] | 27 | 27 | 27 | 27 | 27 | 27 | 27 | 27 |
| Sacrificial yarn | Fineness [denier] | 18 | 18 | 32 | 30 | 30 | 30 | 18 | 32 |
| | Filaments [number] | 2 | 2 | 2 | 6 | 6 | 6 | 2 | 2 |
| | Density of yarns [number/inch] | 108 | 108 | 108 | 54 | 54 | 54 | 108 | 108 |
| MD cross section | d1 [μm] | 824 | 824 | 844 | 867 | 867 | 867 | 844 | 824 |
| | P [μm²] | 1452 | 1452 | 2576 | 2407 | 2407 | 2407 | 2576 | 1452 |
| | n [number] | 4 | 4 | 4 | 2 | 2 | 2 | 4 | 4 |
| | d2 [μm] | 150 | 150 | 156 | 121 | 121 | 121 | 156 | 150 |
| | d2/d1 × (n + 1) [—] | 0.91 | 0.91 | 0.92 | 0.42 | 0.42 | 0.42 | 0.92 | 0.91 |
| | d3 [μm] | 187 | 187 | 188 | 373 | 373 | 373 | 188 | 187 |
| | d3/d1 × (n + 1) [—] | 1.13 | 1.13 | 1.11 | 1.29 | 1.29 | 1.29 | 1.11 | 1.13 |
| | Width of reinforcing yarn [μm] | 105 | 105 | 123 | 101 | 101 | 101 | 123 | 105 |
| TD cross section | d1 [μm] | 854 | 854 | 869 | 893 | 893 | 893 | 869 | 854 |
| | P [μm²] | 1452 | 1452 | 2576 | 2407 | 2407 | 2407 | 2576 | 1452 |
| | n [number] | 4 | 4 | 4 | 2 | 2 | 2 | 4 | 4 |
| | d2 [μm] | 144 | 144 | 157 | 245 | 245 | 245 | 157 | 144 |
| | d2/d1 × (n + 1) [—] | 0.84 | 0.84 | 0.90 | 0.82 | 0.82 | 0.82 | 0.90 | 0.84 |
| | d3 [μm] | 211 | 211 | 199 | 324 | 324 | 324 | 199 | 211 |
| | d3/d1 × (n + 1) [—] | 1.24 | 1.24 | 1.14 | 1.09 | 1.09 | 1.09 | 1.14 | 1.24 |
| | Width of reinforcing yarn [μm] | 113 | 113 | 119 | 103 | 103 | 103 | 119 | 113 |
| Region (Sa) of layer (S) | Ion exchange capacity [meq/g dry resin] | 1.25 | 1.30 | 1.30 | 1.10 | 1.25 | 1.30 | 1.10 | 1.10 |
| Electrolysis voltage [V] | | 3.030 | 3.025 | 3.015 | 3.100 | 3.080 | 3.075 | 3.060 | 3.060 |
| Voltage difference [mV] to Ex. 4 | | −70 | −75 | −85 | 0 | −20 | −25 | −40 | −40 |

In Ex. 1 to 3 using ion exchange membranes satisfying the conditions of the present invention, the electrolysis voltage was low despite the average distance (d1) was small, as compared with Ex. 4 using an ion exchange membrane wherein the average number (n) of elution portions was less than 4, and the ion exchange capacity of layer (Sa) of the layer (S) was less than 1.15 meq/g dry resin.

Further, with respect to Ex. 1 to 3, as compared with Ex. 4, the voltage difference was −20 mV in Ex. 5 wherein the ion exchange capacity of layer (Sa) was 1.25 meq/g dry resin, and the voltage difference was −40 mV in Ex. 7 wherein the average number (n) of elution portions was 4, and thus, the voltage difference having these voltage differences added up, was −60 mV. Whereas, in Ex. 1 having the features of Ex. 5 and Ex. 7 combined, the voltage difference to Ex. 4 was −70 mV, i.e. greater than the voltage difference obtained by adding up the voltage differences in Ex. 5 and Ex. 7, and thus, a synergistic effect was observed.

Similarly, with respect to Ex. 1 to 3, as compared with Ex. 4, the voltage difference was −25 mV in Ex. 6 wherein the ion exchange capacity of layer (Sa) was 1.30 meq/g dry resin, and the voltage difference was −40 mV in Ex. 7 wherein the average number (n) of elution portions was 4, and thus, the voltage difference having these voltage differences added up, was −65 mV. Whereas, in Ex. 2 having the features of Ex. 6 and Ex. 7 combined, the voltage difference to Ex. 4 was −75 mV, i.e. greater than the voltage difference obtained by adding up the voltage differences in Ex. 6 and Ex. 7, and thus a synergistic effect was observed.

Similarly, with respect to Ex. 1 to 3, as compared with Ex. 4, the voltage difference was −25 mV in Ex. 6 wherein the ion exchange capacity of layer (Sa) was 1.30 meq/g dry resin, and the voltage difference was −40 mV in Ex. 8 wherein the average number (n) of elution portions was 4, and thus, the voltage difference having these voltage differences added up, was −65 mV. Whereas, in Ex. 3 having the features of Ex. 6 and Ex. 8 combined, the voltage difference to Ex. 4 was −85 mV, i.e. greater than the voltage difference obtained by adding up the voltage differences in Ex. 6 and Ex. 8, and thus, a synergistic effect was observed.

Further, in the measurements of the average distances d1 to d3, the total area (P) and the width of a reinforcing yarn in Ex. 1 to 3, the measured values were all within the above ranges at each of 10 locations.

INDUSTRIAL APPLICABILITY

The electrolysis apparatus having the ion exchange membrane for alkali chloride electrolysis of the present invention is widely useful for producing chlorine and sodium hydroxide or potassium hydroxide by industrial electrolysis of an aqueous sodium chloride solution or an aqueous potassium chloride solution.

This application is a continuation of PCT Application No. PCT/JP2015/081640, filed on Nov. 10, 2015, which is based upon and claims the benefit of priority from Japanese Patent Application No. 2014-227994 filed on Nov. 10, 2014. The contents of those applications are incorporated herein by reference in their entireties.

REFERENCE SYMBOLS

1: Ion exchange membrane for alkali chloride electrolysis, 10: electrolyte membrane, 12: layer (C), 14: layer (S), 16: layer (Sb), 18: layer (Sa), 20: reinforcing material, 22: reinforcing yarn, 24: sacrificial yarn, 26: filament, 28: elution portion, Sa: layer (Sa) of layer (S), 121: NaCl aqueous solution, 122: dilute NaCl aqueous solution, 123: electrodialysis water

What is claimed is:

1. An ion exchange membrane for alkali chloride electrolysis comprising:
    a layer (S) comprising a fluorinated polymer of a monomer of formula (4):

$$CF_2=CF-O-R^{f2}-A^2 \qquad (4),$$

wherein
    $R^{f2}$ is a perfluoroalkylene group having from 1 to 20 carbon atoms, which may contain an etheric oxygen atom and may be straight-chained or branched,
    $A^2$ is a group convertible to a sulfonic acid functional group; and
    a reinforcing material disposed in the layer (S) substantially in parallel to the layer (S), wherein:
    the layer (S) is a laminate comprising a single layer (Sa), at least one layer (Sb), and the reinforcing material, wherein the reinforcing material is disposed between the layer (Sa) and the layer (Sb) or the reinforcing material is disposed in the layer (Sb);
    the reinforcing material is a woven fabric comprising reinforcing yarns for the weft and warp and sacrificial yarns for the weft and warp;
    in a cross section of the layer (S) perpendicular to the length direction of the reinforcing yarns, the average distance (d1) from the center of a reinforcing yarn to the center of the adjacent reinforcing yarn is from 750 to 1,000 μm;
    in the layer (S), elution portions formed by elution of the sacrificial yarns are present;
    the total area (P) of the cross-sectional area of an elution portion and the cross-sectional area of a sacrificial yarn remaining in the elution portion is from 500 to 5,000 μm²; the average number of elution portions between adjacent reinforcing yarns is from 4 to 6; and
    the ion exchange capacity of the layer (Sa) is from 1.15 meq/g to 2.0 meq/g dry resin.

2. The ion exchange membrane for alkali chloride electrolysis according to claim 1, wherein the ion exchange capacity of the layer (Sb) is lower than the ion exchange capacity of the layer (Sa).

3. The ion exchange membrane for alkali chloride electrolysis according to claim 1, wherein layer (S) further comprises at least one layer (C) comprising a fluorinated polymer having carboxylic acid functional groups, wherein layer (C) is disposed on the surface of layer (S) which is opposite of layer (Sa).

4. The ion exchange membrane for alkali chloride electrolysis according to claim 1, wherein formula (1) is satisfied in a cross section perpendicular to the length direction of the reinforcing yarns:

$$0.5 \leq \{d2/d1 \times (n+1)\} \leq 1.5 \qquad (1)$$

wherein:
    d1 is the average distance from the center of a reinforcing yarn to the center of the adjacent reinforcing yarn;
    d2 is the average distance from the center of an elution portion to the center of the adjacent elution portion; and
    n is the average number of elution portions that exist between adjacent reinforcing yarns.

5. The ion exchange membrane for alkali chloride electrolysis according to claim 4, wherein formula (1') is satisfied at all measurement points measured to determine the average distance (d1) and the average distance (d2) in a cross section perpendicular to the length direction of the reinforcing yarns:

$$0.5 \leq \{d2'/d1 \times (n+1)\} \leq 1.5 \quad (1')$$

wherein:
d2' is the distance from the center of an elution portion to the center of the adjacent elution portion at an optional measurement point; and
d1 and n are each as defined in the formula (1).

6. The ion exchange membrane for alkali chloride electrolysis according to claim 1, wherein formula (2) is satisfied in a cross section perpendicular to the length direction of the reinforcing yarns:

$$0.5 \leq \{d3/d1 \times (n+1)\} \leq 1.5 \quad (2)$$

wherein
d1 is the average distance from the center of a reinforcing yarn to the center of the adjacent reinforcing yarn;
d3 is the average distance from the center of a reinforcing yarn to the center of the adjacent elution portion; and
n is the average number of elution portions that exist between adjacent reinforcing yarns.

7. The ion exchange membrane for alkali chloride electrolysis according to claim 6, wherein formula (2') is satisfied at all measurement points measured to determine the average distance (d1) and the average distance (d3) in a cross section perpendicular to the length direction of the reinforcing yarns:

$$0.5 \leq \{d3'/d1 \times (n+1)\} \leq 1.5 \quad (2')$$

wherein:
d3' is the distance from the center of a reinforcing yarn to the center of the adjacent elution portion at an optional measurement point; and
d1 and n are each as defined in formula (2).

8. The ion exchange membrane for alkali chloride electrolysis according to claim 1, wherein the thicknesses of the reinforcing yarns in a cross section perpendicular to the length direction of the reinforcing yarns are from 70 to 160 µm.

9. An alkali chloride electrolysis apparatus comprising an electrolytic cell which comprises:
a cathode; an anode; and
the ion exchange membrane for alkali chloride electrolysis as defined in claim 1, wherein the ion exchange membrane for alkali chloride electrolysis is installed between the anode and the cathode in the electrolytic cell substantially in parallel to the anode and the cathode, so as to partition inside of the electrolytic cell into a cathode chamber on the cathode side and an anode chamber on the anode side.

10. The ion exchange membrane for alkali chloride electrolysis according to claim 1, wherein $A^2$ is selected from the group consisting of $-SO_2F$, $-SO_2Cl$, and $-SO_2Br$.

11. The ion exchange membrane for alkali chloride electrolysis according to claim 1, wherein the monomer of formula (4) is selected from the group consisting of:
$CF_2=CF-O-(CF_2)_a-SO_2F$, wherein a is an integer of from 1 to 8;
$CF_2=CF-O-CF_2CF(CF_3)O(CF_2)_a-SO_2F$, wherein a is an integer of from 1 to 8; and
$CF_2=CF[OCF_2CF(CF_3)]_aSO_2F$, wherein a is an integer of from 1 to 5.

* * * * *